UNITED STATES PATENT OFFICE.

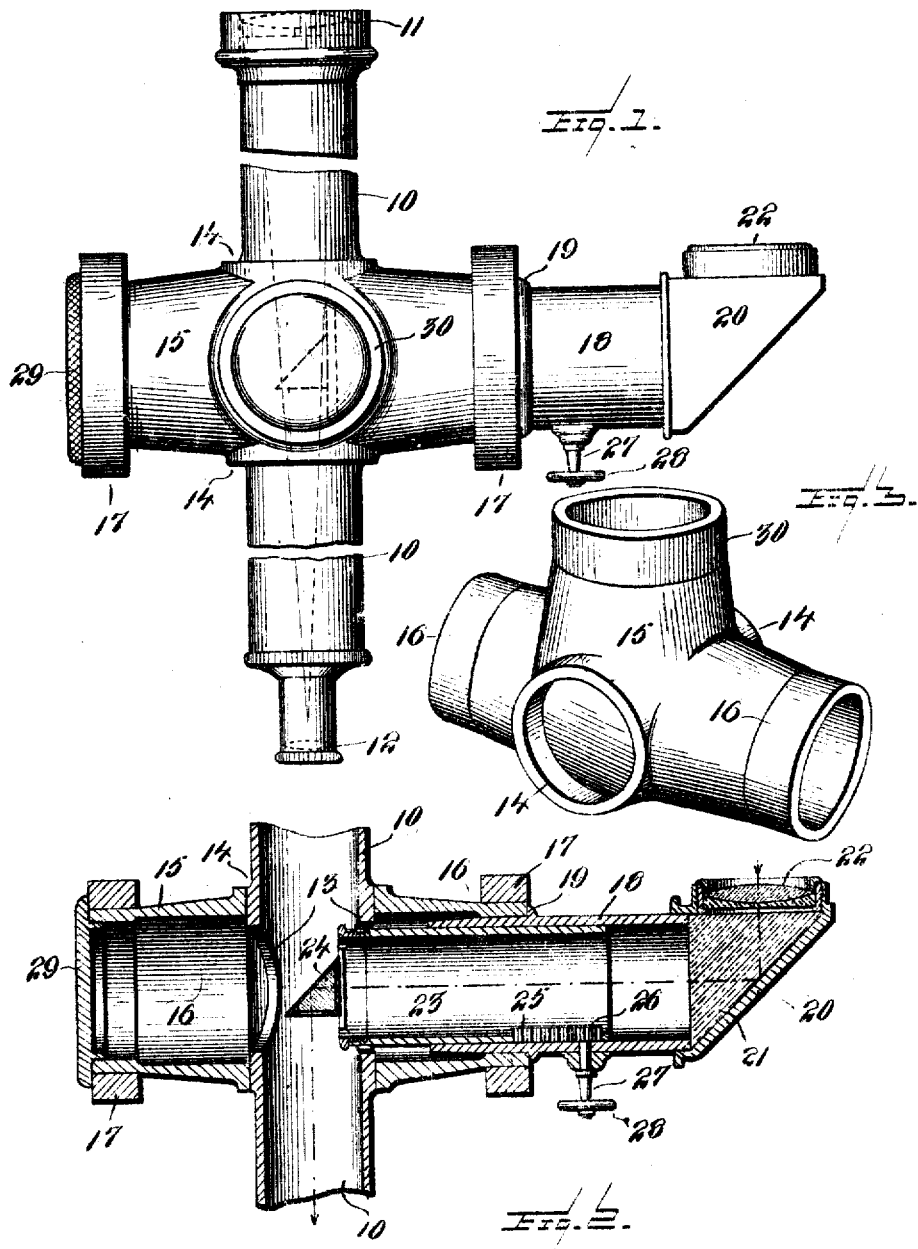

GEORGE N. SAEGMULLER, OF ROCHESTER, NEW YORK.

SIGHTING ATTACHMENT FOR TRANSIT-TELESCOPES.

No. 914,754.   Specification of Letters Patent.   Patented March 9, 1909.

Application filed September 10, 1908. Serial No. 452,361.

*To all whom it may concern:*

Be it known that I, GEORGE N. SAEGMULLER, citizen of the United States, residing at Rochester, county of Monroe, State of New York, have invented certain new and useful Improvements in Sighting Attachments for Transit-Telescopes, of which the following is a specification, reference being had therein to the accompanying drawing.

This invention relates to a sighting attachment for a transit telescope, and particularly to a reflector adapted to be applied intermediate of the objective and eyepiece lenses of the telescope so that when desired a reflecting member may be inserted in the optical line of said lenses.

The invention has for an object to provide a reflecting attachment adapted for application to transit or other telescopes and comprising a movable member carrying a reflecting device which may be shifted into or out of the optical line of the telescope, and such attachment is adapted for application in various relations at an angle to the longitudinal axis of the telescope.

Other and further objects and advantages of the invention will be hereinafter fully set forth and the novel features thereof defined by the appended claims.

In the drawing:—Figure 1 is a plan showing the invention applied to a telescope; Fig. 2 is a horizontal section through the axis thereof; Fig. 3 is a detail perspective of the axial mounting for the telescope and attachment.

Like numerals refer to like parts in the several views of the drawing.

The numeral 10 designates a telescope which may be of any desired character or dimensions and is provided at one end with the objective lens 11 and at the opposite end the usual eyepiece 12. This telescope is provided at opposite sides with the openings 13 disposed adjacent the axis thereof, and for the purpose of obtaining a pivotal mounting the telescope is inserted through an aperture 14 provided in the tubular axis or casing 15. The opposite ends 16 of this casing are pivotally mounted in any desired form of supporting standard 17. The reflecting attachmnet 18 is inserted in one end of this tubular casing and its objective may be rotatively adjusted therein to the desired position. This attachment is here shown as a tube having an abutting flange 19 to limit its inward movement and provided at its outer end with a rotatable casing 20 carrying a reflecting prism 21 which is disposed in alinement with the objective lens 22 mounted in the casing 20. Within the tube of the attachment a telescoping member 23 is disposed and carries at its inner end a movable reflecting member for instance a prism 24 suitably mounted thereon and coöperating in its optical action with the reflecting member, for instance a prism 21 at the outer end of the attachment. This telescoping member may be adjusted so as to bring its reflecting device 24 into or out of the optical line of the telescope by any desired means, one form being here shown, and comprising a rack 25 mounted on the tube and coöperating with the pinion 26 carried by the shaft 27 mounted on the attachment and provided with an operating wheel or handle 28.

In order that the reflecting attachment may be applied to either side of the telescope so as to extend beyond the base upon which it is mounted each side of the pivot is formed tubular and communicates with a side opening in the telescope. When applied, as shown in Fig. 2, the side opposite to the attachment is properly closed by a cap 29 to prevent entrance of light therein. The casing is also provided upon its top with a sleeve 30 of similar diameter to the tubular pivotal casing and adapted to receive the reflecting attachment therein when the attachment is to be used for top sighting. This sleeve is normally closed by a cap when the attachment is not applied thereto. Another cap is used to close the opening at the telescope pivot from which the attachment is removed.

From the foregoing description it will be seen that this reflecting attachment is adapted for application to any character of telescope, and particularly to a mining transit, as in such use the attachment replaces the ordinary side telescope and permits vertical sighting for mine or slope work. By means of the adjustment of the reflecting member of the attachment the telescope may be used for ordinary work when the reflecting member is removed from the optical line thereof, and when inserted in such line the image is reflected from the objective of the attachment and its reflecting member to the eyepiece of the telescope. This provides a simple attachment for application to an ordinary telescope to adapt the same for different classes of work.

The reflecting attachment may be applied at either side of the telescope, and as herein shown the objective of the attachment may be disposed in the same plane as that of the telescope so that both objectives will sight either in a vertical or horizontal or other plane. The mounting of the attachment, however, permits its objective to be adjusted or turned upon its own axis so that its reflecting member may coöperate with the telescope even though the objective of the latter is in a different plane, for instance, the objective of the attachment may be in a vertical plane and the telescope in a horizontal plane. It is also obvious that in top sighting this attachment may be applied to a sleeve of the casing and in that relation coöperates with the eyepiece of the telescope as hereinbefore described.

While the reflecting members of the attachment have been described as prisms it will be understood that mirrors or other optical equivalents may be used in place thereof.

Having described my invention and set forth its merits, what I claim and desire to secure by Letters Patent is:—

1. The combination with a telescope having objective and eyepiece lenses, of a reflecting attachment connected to said telescope intermediate of said lenses, and a reflecting member mounted upon said attachment and movable into and out of the optical field of said telescope.

2. The combination with a pivotally mounted telescope having objective and eyepiece lenses, of a reflecting attachment disposed at the pivot of said telescope, and a reflecting member mounted upon said attachment and movable into and out of the field of the telescope.

3. The combination with a pivotally mounted telescope having objective and eyepiece lenses, of a reflecting attachment disposed at the pivot of said telescope, a reflecting member mounted upon said attachment for movement into and out of the field of the telescope, an objective lens disposed in said attachment beyond the pivot of said telescope, and a reflecting member carried by the attachment and disposed in alinement with the objective lens and movable reflecting member of said attachment.

4. The combination with a telescope having a side aperture therein adjacent its pivot, of a tubular pivoted casing, an attachment disposed in said casing and comprising telescoping tubes, means mounted upon one of said tubes for moving the other through said aperture into and out of the optical field of said telescope, a reflecting member carried by the end of said tube adjacent said aperture, and an objective disposed at the end of said tube removed from said aperture.

5. The combination with a telescope having an aperture in the side wall thereof, of a tubular axis for said telescope embracing said telescope, said aperture being in alinement with said tubular axis, a reflecting attachment mounted in said axis, a movable member for said attachment provided with a reflecting device adapted to be inserted in the optical field of the telescope, and a reflecting member at the outer end of said attachment beyond the axial bearing of the telescope and in alinement with the reflecting device carried by the movable member of the attachment.

6. The combination with a telescope having an aperture in the side wall thereof, of a tubular axis for said telescope embracing said telescope, said aperture being in alinement with said tubular axis, a reflecting attachment mounted in said axis, a movable member for said attachment provided with a reflecting device adapted to be inserted in the optical field of the telescope, a reflecting member at the outer end of said attachment beyond the axial bearing of the telescope and in alinement with the reflecting device carried by the movable member of the attachment, a shaft provided with a pinion mounted in said attachment, and a coöperating rack upon the movable member of the attachment carrying the reflecting device.

7. The combination with a telescope having objective and eyepiece lenses, of an attachment mounted on said telescope intermediate of said lenses, and reflecting members carried by said attachment one thereof being disposed to intercept the optical axis of the telescope and change the ocular field thereof.

8. The combination with a telescope having objective and eyepiece lenses, of an attachment mounted on said telescope intermediate of said lenses, a reflecting member carried by said attachment and disposed to intercept the optical axis of the telescope and change the ocular field thereof, and an objective lens mounted upon said attachment for rotative adjustment thereon.

9. The combination with a telescope having objective and eyepiece lenses and an aperture therein intermediate of said lenses, of a pivoted tubular casing in which said telescope is mounted, and a reflecting member mounted in said casing in alinement with the aperture therein and disposed to intercept the optical axis of the telescope and change the ocular field thereof.

10. The combination with a telescope having objective and eyepiece lenses and an aperture therein intermediate of said lenses, of a pivoted tubular casing in which said telescope is mounted, a reflecting member mounted in said casing in alinement with the aperture therein and disposed to intercept the optical axis of the telescope and change the ocular field thereof, and a closure inserted in the opposite end of said casing from the reflecting member.

11. The combination with a telescope having objective and eyepiece lenses and an aperture in its casing intermediate thereof, of a pivoted tubular casing in which said telescope is mounted, a sleeve upon said casing at an angle to the pivot thereof, and a reflecting member adapted to extend into the optical field of the telescope through said aperture and adapted for mounting upon either said sleeve or upon the pivotal ends of said tubular casing.

12. The combination with a pivoted telescope having objective and eyepiece lenses, of a reflecting attachment disposed at the axis of said telescope, an objective member carried by said attachment beyond said axis a reflecting member mounted upon the attachment, and means for effecting an adjustment of said reflecting member to change the ocular field of said telescope.

In testimony whereof I affix my signature in presence of two witnesses.

GEORGE N. SAEGMULLER.

Witnesses:
M. W. WINES,
ALFRED T. GAGE.